Figure 5:
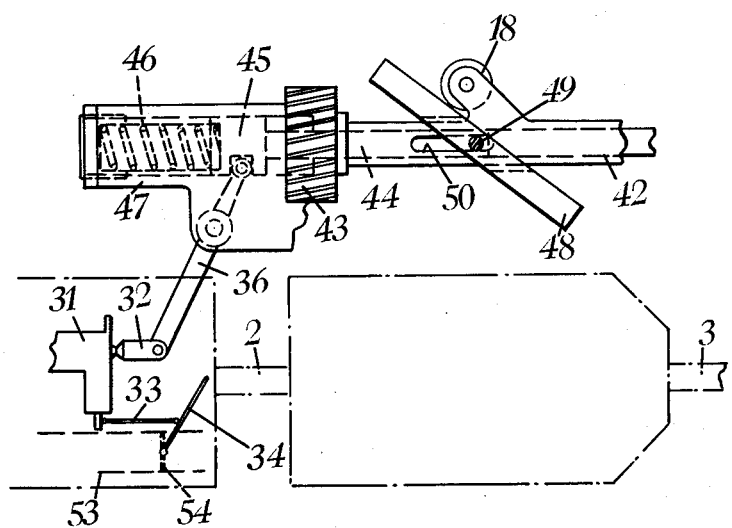

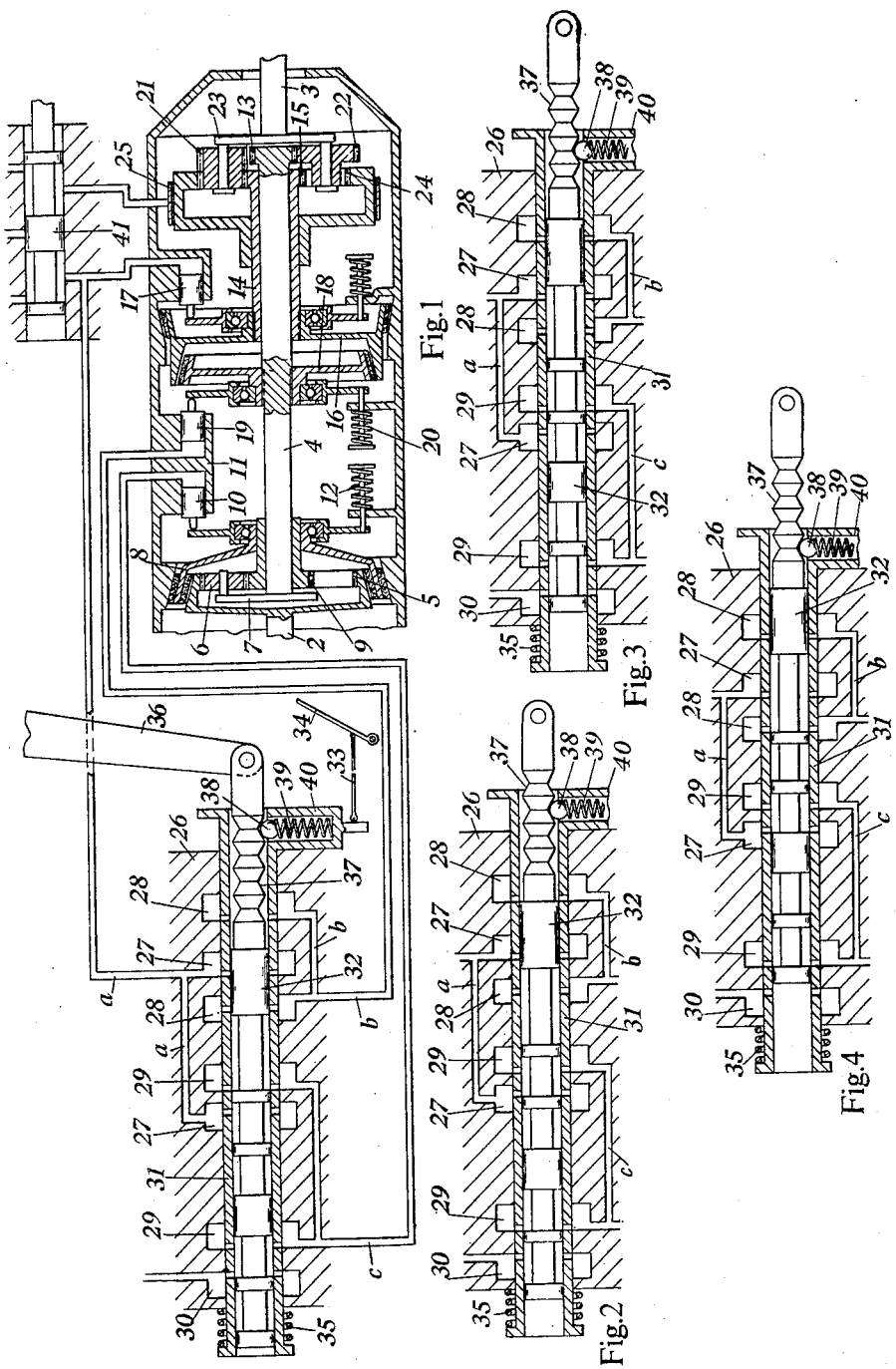

United States Patent Office 3,028,765
Patented Apr. 10, 1962

3,028,765
CONTROL MEANS FOR HYDRAULICALLY OPERATED VEHICLE GEAR-CHANGE MECHANISMS
Axel Charles Wickman, 14 S. Hibiscus Drive,
Hibiscus Island, Miami Beach, Fla.
Filed Dec. 28, 1959, Ser. No. 862,255
Claims priority, application Great Britain Jan. 1, 1959
3 Claims. (Cl. 74—472)

This invention relates to variable speed power transmission mechanisms for vehicles, of the kind in which the power transmission mechanism has combined with it hydraulically operated mechanisms for effecting the gear changes.

The object of the invention is to provide in a convenient form means for controlling the gear-change mechanisms in response to variations of vehicle speed and actuation of the engine control means by the driver.

A gear-change control means in accordance with the invention comprises a valve housing having therein passages for conveying the motive liquid, a ported sleeve slidable in the housing and responsive to movements of the driver-operable engine control means, and a piston valve slidable in the sleeve, the piston valve being operable by a speed-responsive governor.

The invention also comprises the combination with a gear change control means as specified in the preceding paragraph, of a manually operable valve for controlling the flow of motive liquid from a pump to the said gear-change control means.

In the accompanying drawings:

FIGURE 1 represents diagrammatically a valve mechanism in accordance with the invention for controlling the gear changes in a 4-speed and reverse power transmission mechanism of the type above specified.

FIGURES 2, 3 and 4 respectively illustrate successive working positions of the valve mechanism.

FIGURE 5 is a view illustrating diagrammatically one form of the speed-responsive governor, the parts operable thereby, and the driver-operable engine control means.

The example of power transmission mechanism shown in the drawings, comprises a power input shaft 2, a coaxial power output shaft 3, and an intermediate co-axial shaft 4. The shaft 2 has combined with it an internally toothed annulus 5 which engages planet pinions 6 on a planet pinion carrier 7 combined with the intermediate shaft 4. The external periphery of the annulus 5 is adapted to serve as a friction clutch member for co-operating with an axially movable clutch member 8 which is secured to but axially slidable on a sleeve extending from a sun pinion 9. The clutch member 8 is movable into engagement with the annulus 5 by a hydraulically operable piston 10 contained in a cylinder in the housing 11. Retraction of the clutch member 8 from the annulus and engagement of the said member with the housing is effected by a spring 12.

On the intermediate shaft 4 is formed or secured a driving sun pinion 13, and on this shaft is freely mounted a sleeve 14 on which is formed or secured a reaction sun pinion 15. The sleeve 14 carries a friction clutch member 16 which is engageable with the housing by a piston 17 contained in a cylinder in the housing.

A clutch member 18 mounted on the shaft 4 is movable into engagement with the clutch member 16 by a piston 19 contained in a cylinder in the housing and is retractable by a spring 20.

The sun pinions 13, 15 engage with compound planet pinions 21, 22 mounted on a planet pinion carrier 23 which is formed on or secured to the output shaft 3. Also there is provided in engagement with the planet pinions 21 a freely rotatable internally toothed annulus 24 which serves to effect reverse rotation of the shaft 3.

For holding the annulus against rotation there is provided a friction clutch in the form of a contractible band 25 which is operable by hydraulic pressure under the control of a valve as hereinafter described.

The valve mechanism in accordance with the invention for controlling the transmission mechanism above described consists of a valve housing 26 in which is formed a cylindrical bore. In the housing are formed a plurality of annular chambers, namely two annular chambers 27, another two annular chambers 28, a further two annular chambers 29, and an additional annular chamber 30, these chambers being coaxial with and spaced from each other, and having their inner peripheries open to the cylindrical bore in the housing. The chambers 27 are interconnected, and are also connected by a passage *a* to a driver-operable valve to be hereinafter described. The chambers 28 are interconnected and are connected by the supply passage *b* to the cylinder containing the clutch actuating piston 19. The chambers 29 are interconnected and are connected by a passage *c* to the cylinder containing the clutch actuating piston 10. The chamber 30 serves to return the motive liquid to a supply pump (not shown) or to a sump which supplies the pump.

In the bore of the valve housing is contained an axially slidable sleeve 31 having therein an arrangement of ports which communicate as shown with the associated annular chambers in the housing. Also within the sleeve is contained a piston valve 32 adapted to control the direction of flow of the motive liquid from a pump to the various gear changing pistons above mentioned, and from these pistons to the sump or the inlet side of the pump. On the piston valve are formed a plurality of cylindrical lands as shown with intermediate circumferential grooves of appropriate axial lengths.

One end of the sleeve is connected by a link 33 to the accelerator pedal 34 through which the driver controls the variation of speed and/or torque of the engine. The other end of the sleeve is loaded by a compression spring 35.

One end of the piston valve is connected by a lever 36 to a speed-responsive governor of any convenient form. Also adjacent to the said end of the valve is formed a series of V-shaped circumferential grooves 37 having sharp ridges between them. These grooves can be individually engaged by a ball 38 which is loaded by a spring 39 contained in a pocket 40 on the adjacent end of the sleeve 31.

Further there is provided a two-way valve of the piston or other convenient type, the piston 41 of which is operable by the driver for controlling the flow of motive liquid from the pump to the control valve above described and also to the means for actuating the reversing clutch 25.

The arrangement and mode of action of the control means above described is as follows:

When the transmission mechanism is at rest the driver-operable valve 41 occupies its closed position as shown on FIGURE 1 of the drawings. When it is required to bring the first or slow speed gear into action, the valve 41 is moved to the right, so admitting motive liquid along passage *a* directly to the cylinder of the piston 17 and causing the clutch member 16 to be engaged with the gear housing 11 for holding the sun pinion 15. Meanwhile the piston valve 32 remains in its closed position.

After the first-speed gear has been brought into action, an initial depression of the accelerator pedal 34 increases the speed of the vehicle, and when a given speed is attained the governor moves the piston valve 32 from the position shown in FIGURE 1 to that shown in FIGURE 2. In this condition the motive liquid can flow along the passage *a*, and through the valve chambers 27 and 29 and passage *c* to the cylinder containing the piston 10, so causing the clutch member 8 to engage the annulus 5, thereby interlocking this annulus and the sun pinion 9.

With continued depression of the accelerator pedal and progressive increase in the vehicle speed, the piston valve is moved by the governor to the position shown in FIGURE 3. In this condition the motive liquid flows through passage a, chambers 27, 28 and passage b to the cylinder containing the piston 19, so causing the clutch member 18 to be engaged with the clutch member 16, thereby interlocking the sun pinions 13, 15, and connecting the cylinder containing the piston 10 to one of the passages 29 and the exhaust passage 30.

With a still further increase of speed the governor moves the piston valve to the position shown in FIGURE 4. In this condition the piston 19 remains in action and motive liquid can flow along the passage a and passage b, to the cylinder containing the piston 10, so causing the outptu shaft 3 to be driven at the same speed as the input shaft 2.

After each movement of the piston valve by the governor, the valve is held by the spring-loaded ball 38 until the governor reaches a speed at which the force exerted by the governor can overcome the resistance of the ball.

The purpose of the sleeve is to modify the action of the piston valve in response to the governor, the arrangement being such that with increasing depression of the pedal 34 and consequent movement of the sleeve, the speed at which the governor can effect a gear change in the upward direction is increased. Conversely with return of the pedal towards its initial position, movement of the sleeve will cause the gears to change upwardly from the second to the third speed, or from the third speed to the fourth. Further with any gear in action and the pedal only slightly depressed, a quick downward movement of the pedal with consequent momentary quick opening of the engine throttle, will cause a downward change of speed to occur from fourth speed to third, or from third speed to second, or from second speed to the first speed.

If it is desired to restrict the action of the governor so as to prevent automatic changes from the second to the third speed or from the third to the fourth speed, any convenient additional means operable by the driver may be provided. Such means may consist of a driver operable valve arranged to close or open to exhaust any of the passages a, b, c. Alternatively any convenient stop movable by the driver may be combined with the governor.

When it is required to reverse the direction of rotation of the output shaft 3, the driver-operable valve 41, is moved to the left so as to isolate the control valve from the transmission mechanism, and admit motive liquid to the clutch 25 acting on the annulus 24.

The speed-responsive governor may have the form described in the specification of co-pending application Serial No. 862,256 and illustrated diagrammatically in FIGURE 5. Thus, the speed-responsive governor is provided with an axially immovable hollow driving shaft 42 on which is formed or secured a helical gear 43 adapted to be rotated by the power output shaft 3 in a manner not shown. Within the hollow driving shaft 42 is contained an axially slidable driven shaft 44 which at one end abuts against a slidable thrust piece 45 loaded by a spring or springs as 46. To the spring-loaded thrust piece 45 is connected one end of the lever 36 which is pivoted to the housing 47 containing the spring-loaded thrust piece, and which is connected at its other end to the piston valve 32. Around the driving shaft 42 is mounted a centrifugal mass in the form of an annular disc which is connected to the driven shaft 44 by a transverse pivot pin 49 which is secured to the disc and passes through a longitudinal slot 50 in the driving shaft and a transverse hole in the driven shaft. The disc 48 is disposed obliquely to the axis of the shafts 42 and 44, and at one side makes contact with an abutment in the form of a roller 51 on an arm 52 extending laterally from the driving shaft 42, the arrangement being such that with increasing speed of the driving shaft, the disc 48 moves about its pivot axis in the directon for exerting pressure on the abutment roller, and thereby causing axial movement to be imparted to the driven shaft 44 against the action of the spring-loaded thrust piece 45. This axial movement of the driven shaft 44 is transmitted by the lever 36 to the piston valve 32 of the gear-change control means above described. With diminishing speed of the driving shaft 42 the piston valve 32 and the disc 48 are moved in the opposite direction by the spring-loaded thrust piece 45.

As illustrated in FIGURE 5, the power input shaft 2 of the power transmission mechanism is driven by an engine 53 having a controlling throttle valve 54 operable by the accelerator pedal 34.

In the foregoing description the invention has been described with reference to one particular form of power transmission mechanism. It is to be understood however, that the invention is applicable in essentially the same manner for controlling a transmission mechanism capable of giving any other desired range of speed changes.

Having thus described my invention what I claim as new and desire to secure by Letters Patent is:

1. For use in conjunction with a vehicle engine having in association therewith driver-operable engine control means, a variable speed power transmission mechanism, hydraulically operable means for effecting gear changes in said mechanism, and a speed-responsive governor, a control means for said mechanism comprising in combination a valve housing having therein a plurality of conducting passages for the motive liquid of said hydraulically operable means, and a cylindrical bore from which parts of said passages extend, a ported sleeve slidably mounted in said bore, a piston valve slidably mounted in said sleeve, actuating means connected to said piston valve and operable by said speed-responsive governor for imparting to said piston valve sliding movement relative to said sleeve, and thereby controlling the flow of the motive liquid through said passages, additional actuating means connected to said sleeve and operable by said driver-operable engine control means for imparting to said sleeve sliding movement relative to said piston valve, and thereby modifying the controlling effect of the sliding movement of said piston valve on the flow of the motive liquid through said passages so that the said flow of the motive liquid is dependent on the relative positions of said piston valve and said sleeve, and spring-loaded means interconnecting said sleeve and piston valve to oppose, but allow, relative sliding movement thereof.

2. A control valve means according to claim 1, and having a manually operable valve whereby the flow of the motive liquid to said passages is controllable.

3. A control means according to claim 1, in which one end of said piston valve is provided with a series of V-shaped circumferential grooves, and which includes a spring-loaded catch carried by said sleeve and successively engageable with said grooves.

References Cited in the file of this patent
UNITED STATES PATENTS

| | | |
|---|---|---|
| 2,588,140 | McFarland et al. | Mar. 4, 1952 |
| 2,651,949 | Barnes | Sept. 15, 1953 |
| 2,773,352 | Fujii | Dec. 11, 1956 |
| 2,891,516 | Pippenger | June 23, 1959 |